(12) United States Patent
Mishra et al.

(10) Patent No.: US 11,416,158 B1
(45) Date of Patent: Aug. 16, 2022

(54) SELECTIVE DATA UNARCHIVING

(71) Applicant: SAP SE, Walldorf (DE)

(72) Inventors: Siddhartha Mishra, Gurgaon (IN);
Gaurav Kumar Dhankhar, Gurgaon (IN); Ankit Rastogi, Ghaziabad (IN); Shilpi Khanna, Gurgaon (IN); Anurag Sharma, Ghaziabad (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/196,263

(22) Filed: Mar. 9, 2021

(51) Int. Cl.
*G06F 3/06* (2006.01)

(52) U.S. Cl.
CPC .......... *G06F 3/0649* (2013.01); *G06F 3/0608* (2013.01); *G06F 3/0683* (2013.01)

(58) Field of Classification Search
CPC ....... G06F 3/0647–0649; G06F 3/0608; G06F 3/0683
See application file for complete search history.

(56) References Cited

U.S. PATENT DOCUMENTS

| 10,444,991 B1* | 10/2019 | Lu ......................... G06F 3/0656 |
| 2003/0120625 A1* | 6/2003 | Jackson .............. G06F 11/1451 |
| 2008/0018506 A1* | 1/2008 | Raveendran ......... H04N 19/117 375/E7.181 |
| 2011/0145196 A1* | 6/2011 | Bender ................. G06F 16/185 707/640 |
| 2012/0150799 A1* | 6/2012 | Matsuzawa ........... G06F 16/119 707/622 |
| 2014/0006357 A1* | 1/2014 | Davis .................. G06F 11/1446 707/667 |
| 2016/0210064 A1 | 7/2016 | Dornemann et al. |
| 2019/0213089 A1 | 7/2019 | Podge et al. |
| 2020/0272492 A1 | 8/2020 | Guturi et al. |

FOREIGN PATENT DOCUMENTS

JP 2005011121 A * 1/2005

OTHER PUBLICATIONS

"Data Archiving with Archive Development Kit (ADK)," *SAP System*, downloaded from: https://help.sap.com/viewer/c6ef916aeac74db0a6bec2142bc00248/6.17.20/en-US/4d8c7807910b154ee10000000a42189e.html, 2 pages (document not dated; downloaded Feb. 23, 2021).
"Reloading Archived Data From NLS to SAP BW," *SAP Help Portal*, downloaded from: https://help.sap.com/viewer/db6_nls/16784eee4a2d4c06ab41290d98772501.html, 3 pages (document not dated; downloaded Mar. 2, 2021).

(Continued)

*Primary Examiner* — Chie Yew
(74) *Attorney, Agent, or Firm* — Klarquist Sparkman, LLP

(57) ABSTRACT

Systems, methods, and computer media are described for memory-efficient unarchiving. Data items can be archived and removed from primary data store over time. An archive block containing both a data item of interest and additional data items can be located. The data item of interest, as well as the additional data, can be loaded into a secondary data store. The data item of interest can then be extracted from the secondary data store and reloaded into the primary data store. The secondary data store can then be cleared. Memory-efficient unarchiving more efficiently uses computing resources and unarchives only the data that is needed.

17 Claims, 6 Drawing Sheets

(56) References Cited

OTHER PUBLICATIONS

"Reloading Archives," *SAP Documentation*, downloaded from: https://help.sap.com/erp_hcm_ias2_2015_02/helpdata/en/4d/8c7887910b154ee10000000a42189e/content.htm?no_cache=true, 2 pages (document not dated; downloaded Mar. 2, 2021).

Sai, "A Document on Archiving," *SAP Blogs*, downloaded from: https://blogs.sap.com/2017/05/19/a-document-on-archiving/, 18 pages (document dated May 19, 2017, downloaded on Feb. 1, 2021).

Thumma, "SAP Archiving Process and Configuration Steps," *SAP Blogs*, downloaded from: https://blogs.sap.com/2020/10/07/sap-archiving-process-and-configuration-steps/, 27 pages (document dated Oct. 7, 2020, downloaded on Feb. 23, 2021).

Communication, extended European Search Report, dated May 6, 2022, issued by the European Patent Office, Patent Application No. 22153843.2-1203 (9 pages).

* cited by examiner

SELECTIVE DATA UNARCHIVING

BACKGROUND

Data generated or used by applications continues to increase in quantity. To limit the memory needed to store such large quantities of data, older data can be archived. Archiving data, however, presents other challenges.

DETAILED DESCRIPTION

The examples described herein generally unarchive data in a memory-efficient manner. As the amount of data stored by a given system increases, older data is typically archived to limit the amount of data maintained in available memory. Frequently, data that is archived is compressed or aggregated in some manner and stored in a repository ("archive") that is less easily accessed than the available memory. For example, data for a group of users of an application over a timeframe (e.g., one month, quarter, year, etc.) can be consolidated into a single archive file or block. Data retention policies can be established to archive data after it is no longer expected to be needed (e.g., when the data is six months old, one year old, etc.). In this way, expensive available memory can be kept free for new and recent data while older data is preserved.

Accessing archived data is typically more complicated and difficult than accessing data maintained in available memory. In many cases, the data must first be unarchived and reloaded into available memory. Such unarchiving often requires reloading all of the data in the archive file or block containing desired data. For example, if data for a transaction for a particular user is desired to be unarchived, and the desired data is archived in a block of transactions over a three month time period for a group of users, all of the data for those users over the three month time period is reloaded simply to access the one desired transaction.

The examples described herein provide memory-efficient unarchiving. Rather than reloading all the data in a particular archive block into available memory, the data is reloaded into a secondary data store (e.g., temporary storage). Data of interest can then be extracted from the secondary data store and reloaded into available memory. The secondary data store can be cleared after the data of interest is extracted. The described examples more efficiently use scarce and expensive memory and unarchive only the data that is needed. Such targeted unarchiving also allows for shorter data retention time periods to be established, which reduces the amount of available memory needed. Further, data unarchived through the memory-efficient approach can be flagged as such, and rules can be established to enable operations on the unarchived and reloaded data.

Examples are described below with reference to FIGS. 1-6.

Figure 1:
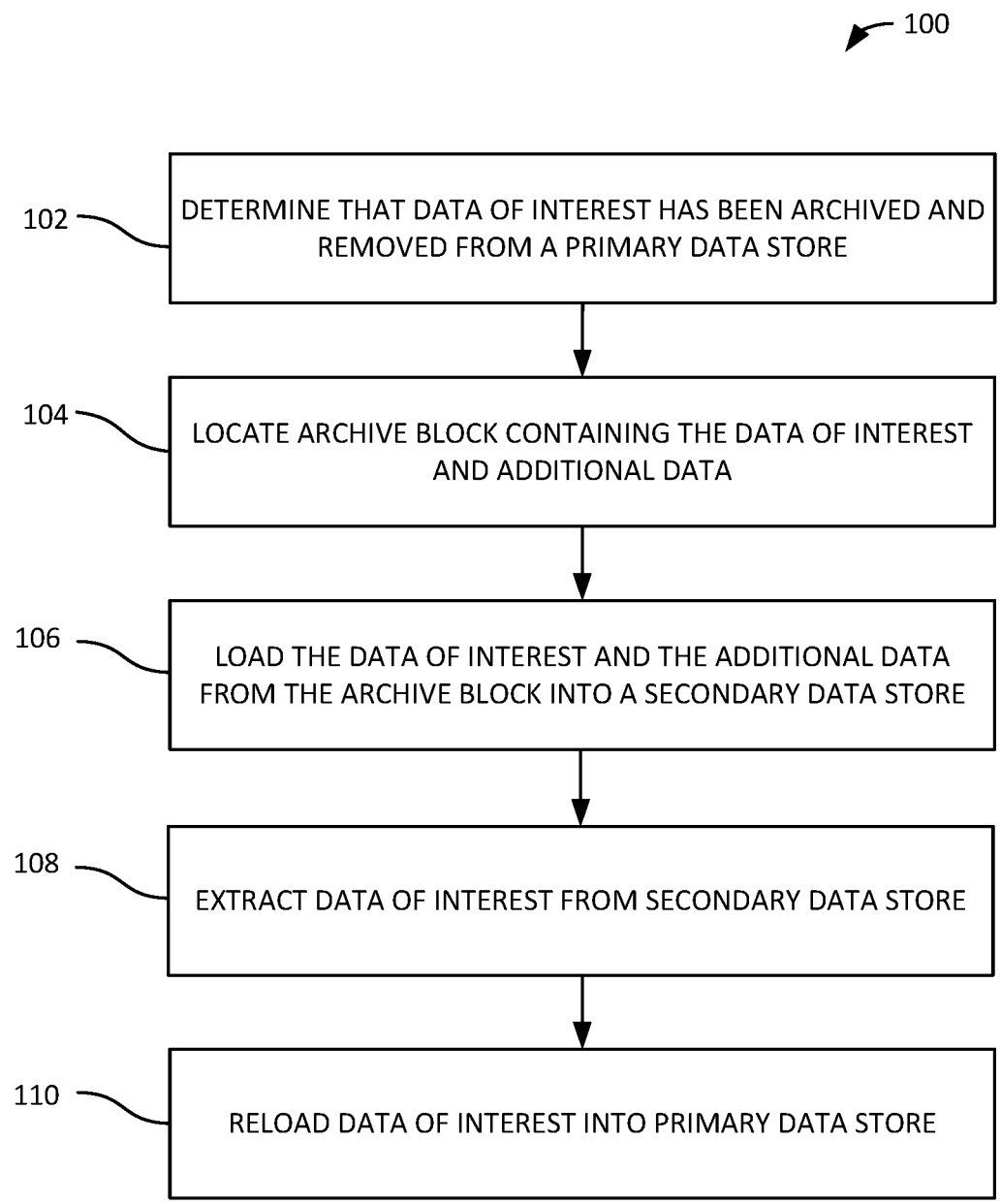
FIG. 1 illustrates an example method of unarchiving data in a memory-efficient manner.

FIG. 1 illustrates a method 100 of memory-efficient unarchiving. In process block 102 it is determined that data of interest has been archived and removed from a primary data store. The data of interest can be document(s), file(s), database table(s) contents, or other data. Data can be indicated as archived, for example, by storing a pointer to the archive block containing the data in the primary data store. Other approaches, such as an archive table or list can also be used. In such approaches, if data is not found after searching the primary data store (also referred to herein as the "available memory"), the archive table or list can be searched for the data's identifier (e.g., file name, user identifier, date, etc.) and the data's corresponding archive location.

In process block 104, an archive block containing the data of interest is located (e.g., based on the pointer or archive table). The archive block contains the data of interest as well as additional data. Data can be archived by user group, geographic area, time period, or other characteristic, and one archive block is not necessarily limited to data for one user. As used herein, "archive block" refers to a portion of an archive and can be a file, table contents, or other unit. Archive blocks can have an associated index or metadata describing the data within the block (e.g., user identifiers, creation dates, etc. of the data).

In process block 106, both the data of interest and the additional data from the archive block are loaded into a secondary data store. The secondary data store can be a physically separate data store or a subset of the primary data store. In some examples, the secondary data store is a temporary or transient memory separate from the primary data store. In process block 108, the data of interest is extracted from the secondary data store. For example, the secondary data store can be searched for a file name or other identifier. In process block 110, the data of interest is reloaded into the primary data store. The additional data, however, is not reloaded into the primary data store.

Individual data items in an archive block typically cannot be accessed and reloaded directly from the archive block. Instead, the entire contents of the block are reloaded. By first being loaded into a secondary data store, the data of interest becomes available for extraction and reloading into the primary data store without having to also reload the additional data. The secondary data store can be cleared after the data of interest is reloaded into the primary data store, keeping the size of the secondary data store small. In some examples, loading an archive block into the secondary data store does not affect the archive block—it remains in the archive and continues to include all the data it originally contained. In other examples, after the data of interest is reloaded into the primary data store, the original archive block is replaced with a modified archive block that does not include the data of interest.

The reloaded data of interest can be treated as "new" data subject to the established data retention time period policies (e.g., will be re-archived six months, one year, etc. after creation or last access). Retention periods typically reflect a balance between storage resources and desire/need to have data available. For example, with a two-year retention period, most data archived after two years is unlikely to be needed again, meaning that unarchiving will be infrequent, but the memory needed to store two years of data is much larger than for a shorter retention period. Similarly, with a one-month retention period, less memory is needed, but the likelihood of needing to access data that has already been archived after one month is likely higher, resulting in frequent unarchiving.

Using the memory-efficient unarchiving of the described examples, unarchiving only uses primary storage space corresponding to the unarchived data of interest and not all the additional data stored in the same archive block. As such, there is less of a memory "penalty" for unarchiving. This allows the retention period to be shortened, which allows the primary storage to be smaller, allowing any excess storage to be re-allocated for other purposes.

In many cases, data related to data of interest is also desired. For example, if a utility usage statement (e.g., indicating initial and final usage readings) from eight months ago is unarchived to correct an error, that error has also likely propagated to the more recent statements. Rather than just unarchiving the first erroneous statement, unarchiving the subsequent statements is also desired (e.g., for a retention period of six months, related documents newer than the first erroneous statement and older than six months are unarchived—the most recent six months of statements are still in primary storage and have not yet been archived per the retention policy).

In some examples, method 100 further includes: identifying related data to the data of interest; locating an archive block containing the related data as well as additional unrelated data; loading the related data and the unrelated data into the secondary data store; extracting the related data from the secondary data store; and reloading the related data into the primary data store. The related data may be archived in different archive block(s), in which case the memory-efficient unarchiving prevents additional entire archive blocks from being reloaded. Identification of related data can be done automatically based on temporal or spatial relationships with the data of interest or based on a user identifier, classification, or characteristic associated with both the related data and the data of interest. For example, for recurring data such as a utility statement, data for other time periods with the same user identifier (e.g., account) can be automatically identified. Similarly, if all statements in a geographic area were affected by an error, statements for a particular postal code could be automatically identified.

In some examples, a list, table, or other data structure ("an unarchived data listing") is used to track data that has been unarchived through memory-efficient unarchiving. Prior to locating the archive block containing data of interest, the unarchived data listing can be checked for an identifier associated with the data of interest. The unarchived data listing can also be used in situations in which more than one unarchiving mechanism is available (discussed in detail with respect to FIG. 4).

Figure 2:
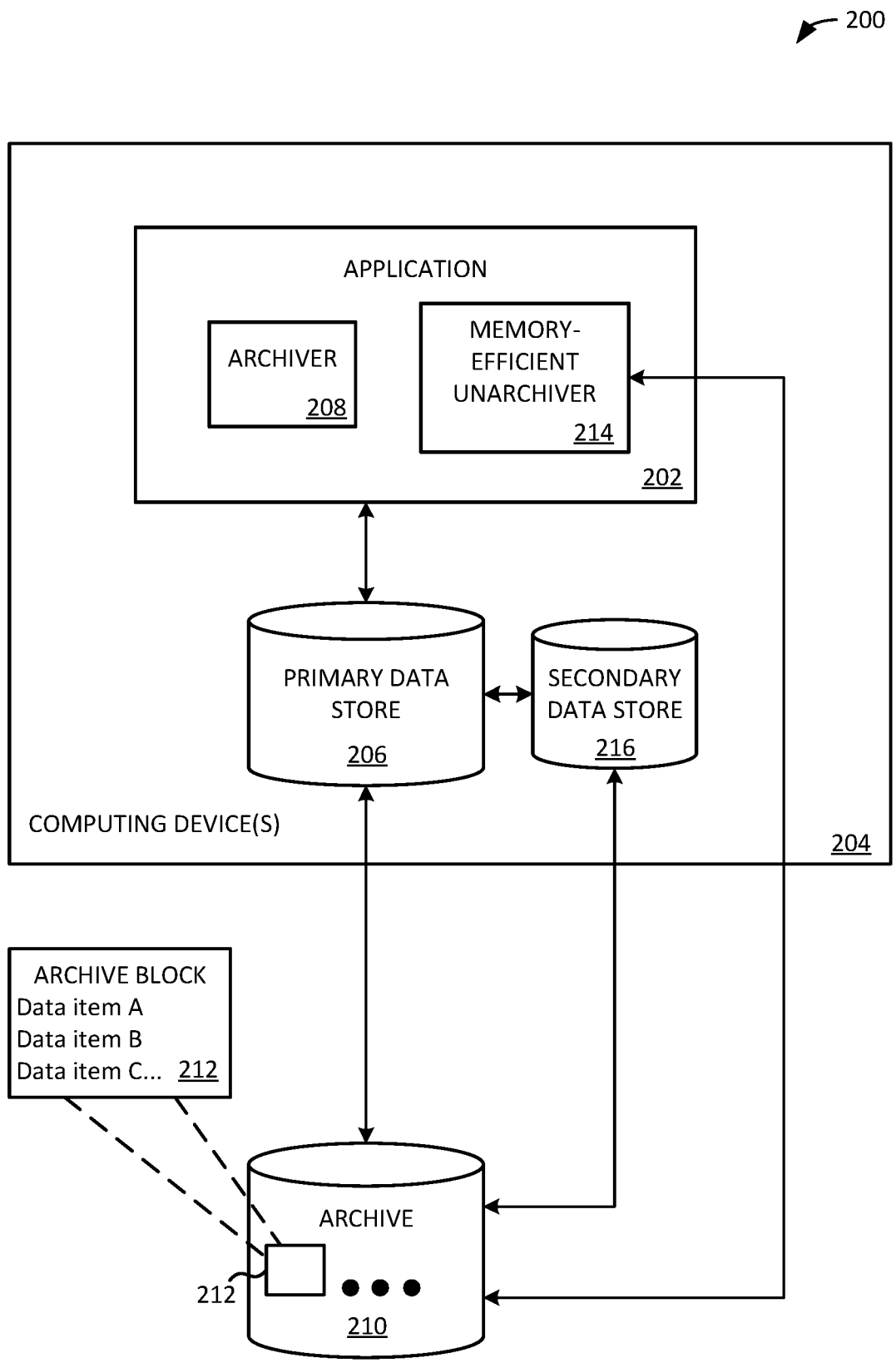
FIG. 2 illustrates an example system configured to unarchive data.

FIG. 2 illustrates a system 200 configured for memory-efficient unarchiving. Application 202 is executing on computing device(s) 204. Application 202 can be a locally installed on-premises application, and computing devices 204 can be local servers or other local computers or a distributed network of servers. Application 202 stores data used by or generated in application 202 in primary data store 206.

Either per a retention policy (e.g., after a set time or when an amount or percentage of storage is used in primary data store 206), or manually, archiver 208 removes data from primary data store 206 and archives the data in archive 210. The archived data in archive 210 is stored in a series of archive blocks, such as archive block 212. Archive block 212 contains a number of individual data items, including data items A, B, C, etc. Archive block 212 can be compressed. The data items in archive block 212 can be related or unrelated. For example, the data items can be customer or account data for different users over a time period.

When a data item is requested via application 202 (e.g., by a user or by a process or other functionality of application 202) that has already been archived, the primary data store 206 is searched for the data item, and a pointer or other reference can be identified that indicates the location of the data in archive 210. Memory-efficient unarchiver 214 retrieves the archive block containing the data item and loads the contents of the archive block into secondary data store 216. Memory-efficient unarchiver 214 then extracts the requested data item and reloads the data item into primary data store 206. In some examples, the data in secondary data store 216 is then erased. In some examples, the archive block containing the requested data item is modified to remove the requested data item and rearchived.

Archiver 208 and memory efficient unarchiver 214 can be part of application 202 as shown in FIG. 2 or can be separate and can perform archiving/unarchiving for multiple applications and/or data stores. System 200 can also include a standard unarchiver (not shown) that reloads the entire archive block into primary data store 206 when a data item contained in the block is requested. In some examples, operations (e.g., operations other than viewing or read only access) cannot be performed on data items reloaded through the standard unarchiver. In such cases, if, for example, a data item of interest is requested for a modification (such as correcting a utility statement usage figure or financial figure), memory-efficient unarchiver 214 can be used instead of the standard unarchiver to allow the data item of interest to be changed. In some situations, the standard unarchiver can be used for unarchiving archive blocks below a certain threshold data size, and memory-efficient archiver 214 can be used for archive blocks larger than the threshold.

In some examples, if the standard unarchiver has been used to unarchive data and an operation is requested that is disabled because standard unarchiving was used, the data can be re-archived and then unarchived again using memory-efficient unarchiving.

Figure 3:
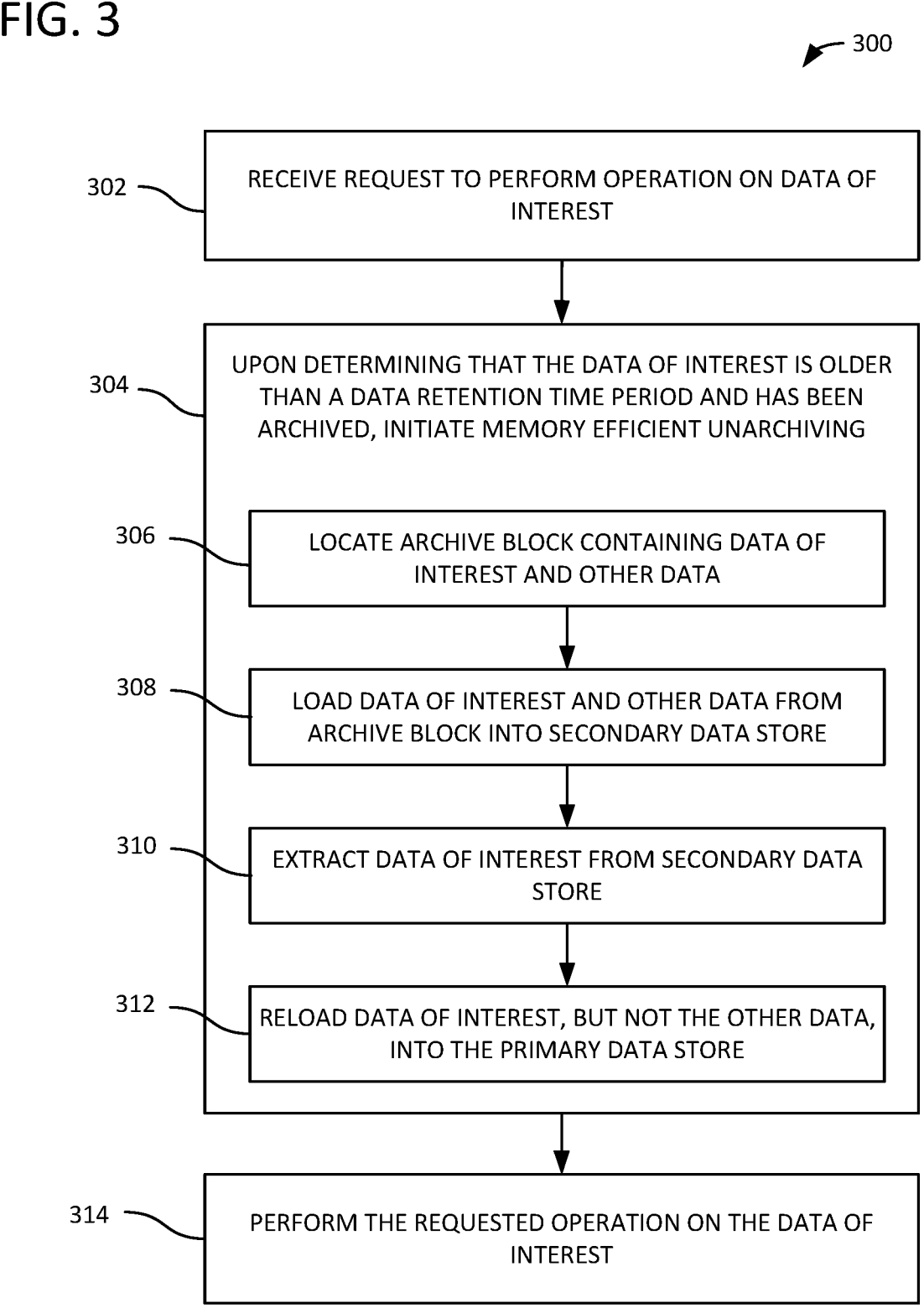
FIG. 3 illustrates an example method in which an operation is performed on data unarchived in a memory-efficient manner.

FIG. 3 illustrates a method 300 of unarchiving data. In process block 302, a request is received to perform an operation on data of interest. The operation can be, for example, modification or reversal of a statement, record, or transaction. In process block 304, upon determining that the data of interest is older than a data retention time period and has been archived and removed from a primary data store, memory-efficient unarchiving is initiated. The memory-efficient unarchiving comprises locating an archive block containing the data of interest along with other data in process block 306 and loading the data of interest and the other data from the archive block into a secondary data store in process block 308. The memory-efficient unarchiving also comprises extracting the data of interest from the secondary data store in process block 310 and reloading the data of interest, but not the other data, into the primary data store in process block 312. The requested operation is performed on the data of interest in process block 314.

Figure 4:
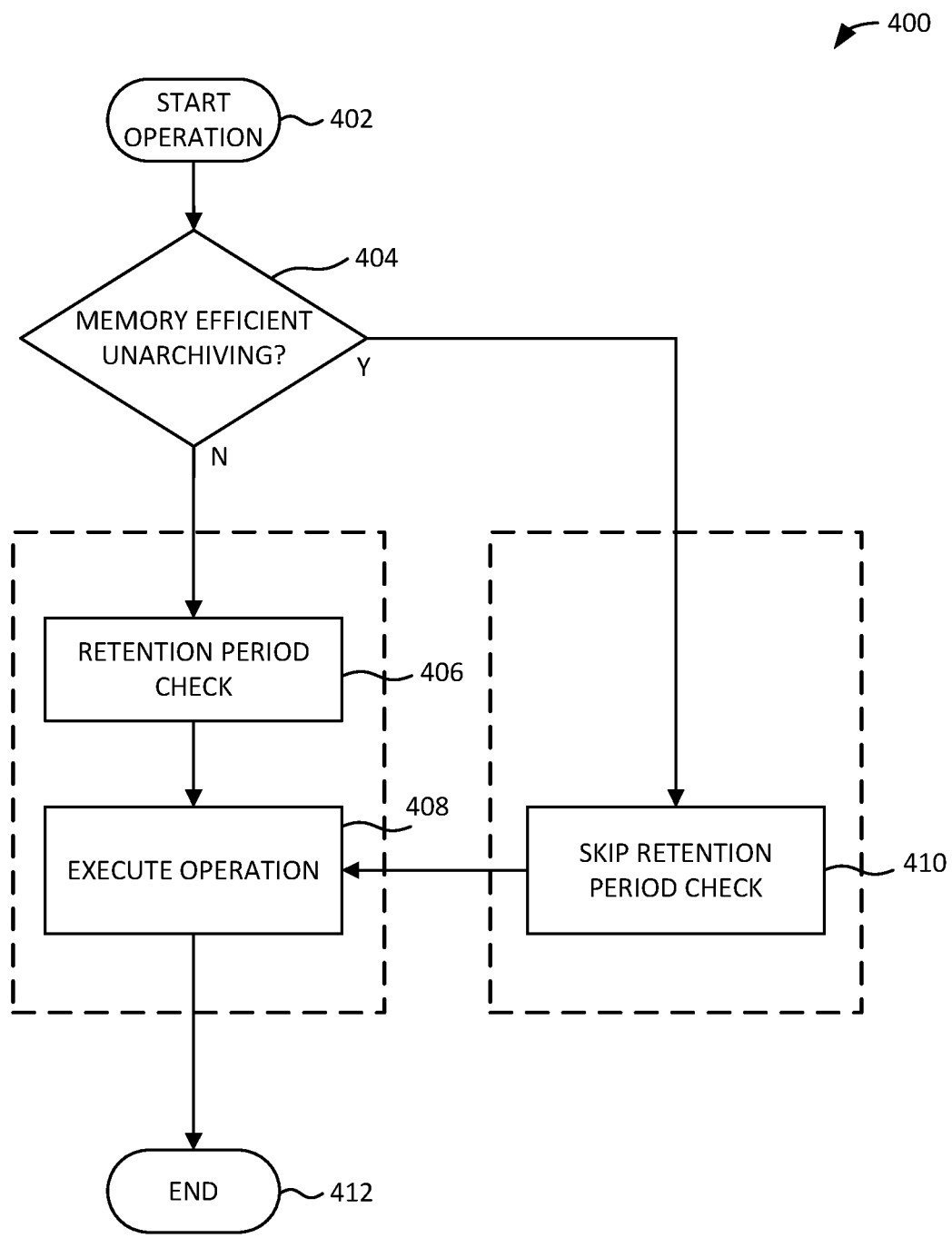
FIG. 4 is a flow chart illustrating performance of operations on data unarchived in a standard manner and a memory-efficient manner.

FIG. 4 illustrates a method 400 in which a retention period check can be skipped for data that has been unarchived using memory-efficient unarchiving (as opposed to standard unarchiving). Method 400 begins in process block 402.

In process block 404, it is determined if the data item was unarchived using memory-efficient unarchiving (e.g., by checking an unarchived data listing). If the data item is not listed, then either standard unarchiving was performed or the data item has not yet been archived. A retention period check is performed in process block 406. In some examples, retention period checks are performed each time before an operation is performed to ensure operations are not performed on old data. If the data is newer than the retention period (i.e., the data has not yet been archived), the operation is executed in process block 408. When standard unarchiving is used, the unarchived data item fails the retention period check and the operation is not executed, effectively making data items unarchived through standard unarchiving "read only."

If, however, the data item is listed in the unarchived data listing, then the retention period check is skipped in process block 410, and the operation is executed in process block 408. Method 400 ends at process block 412.

In some examples, if the data item was not unarchived using memory-efficient unarchiving, the data item can be rearchived and then unarchived a second time using memory-efficient unarchiving, and the data item in primary storage can be replaced by the newly-unarchived version of the data item.

If the archive block originally containing the data item was deleted after standard unarchiving was performed, then the data item (and optionally other data items), can be re-archived into a new archive block, and the new archive block can be unarchived using memory-efficient unarchiving.

Figure 5:
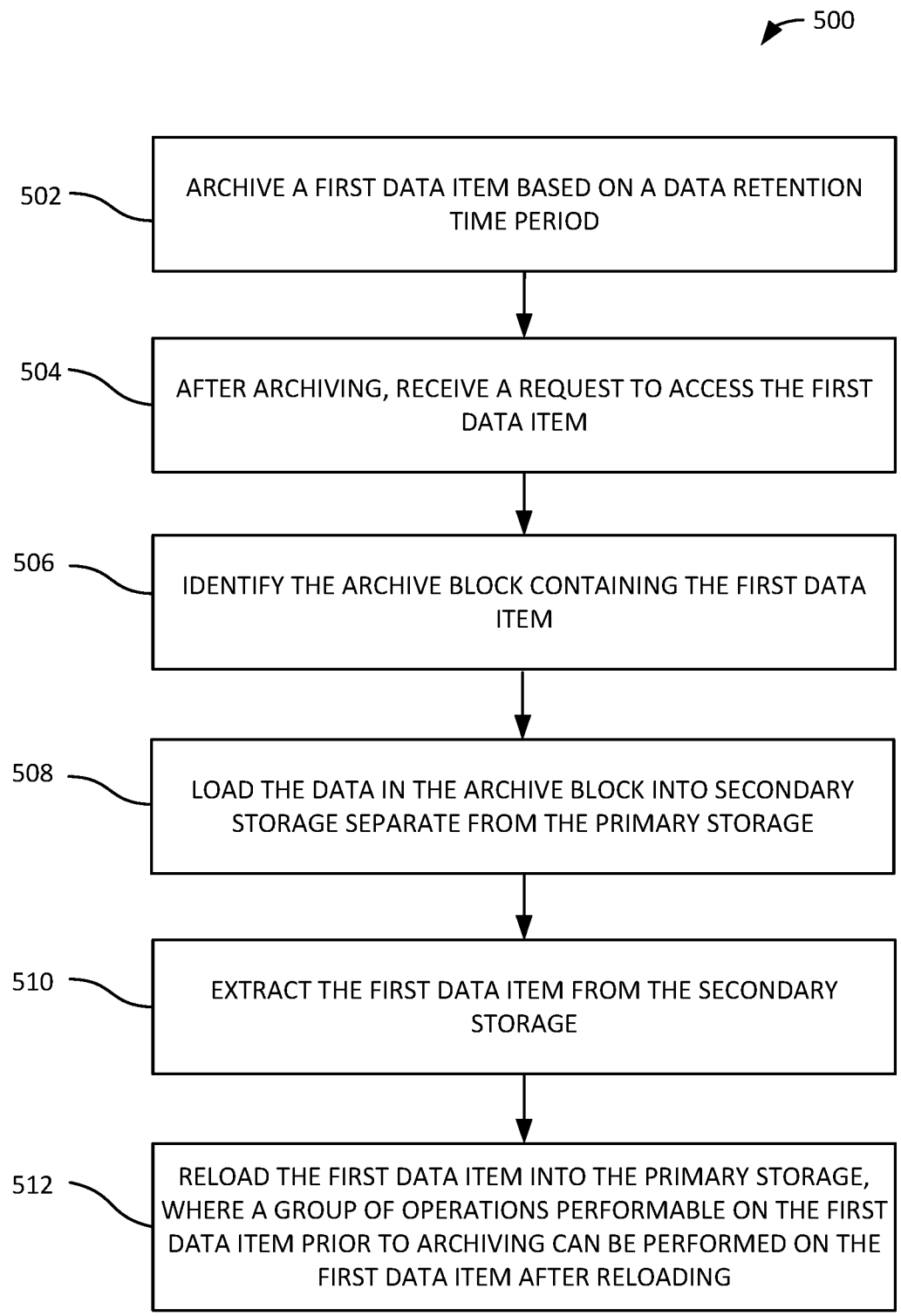
FIG. 5 illustrates an example method of unarchiving data in a memory-efficient manner after the data has been archived based on a data retention time period.

FIG. 5 illustrates a method 500 of unarchiving data. In process block 502, a first data item is archived based on a data retention time period. The archiving comprises removing a group of data items, including the first data item, from primary storage and storing the group of data items together in an archive block. After the archiving, a request to access the first data item is received in process block 504. The archive block containing the first data item is identified in process block 506. In process block 508, the data in the archive block is loaded into secondary storage separate from the primary storage. The first data item is extracted from the secondary storage in process block 510. In process block 512, the first data item is reloaded into the primary storage. A group of operations (e.g., modification, reversal, etc.) performable on the first data item prior to archiving can still be performed on the first data item after reloading.

Example Computing Systems

Figure 6:
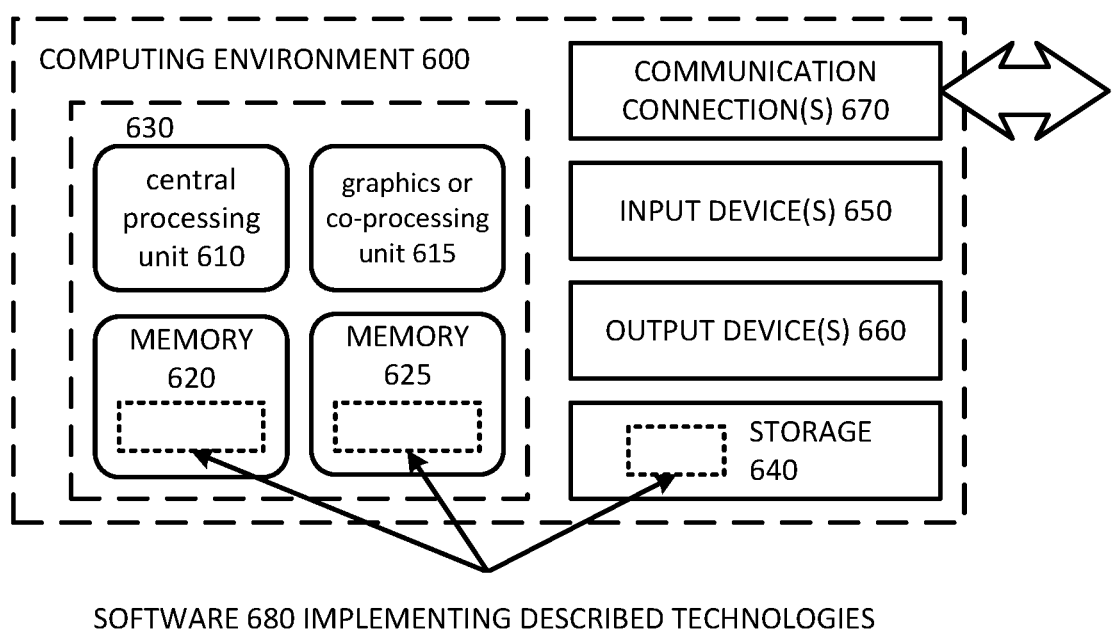
FIG. 6 is a diagram illustrating a generalized implementation environment in which some described examples can be implemented.

FIG. 6 depicts a generalized example of a suitable computing system 600 in which the described innovations may be implemented. The computing system 600 is not intended to suggest any limitation as to scope of use or functionality, as the innovations may be implemented in diverse general-purpose or special-purpose computing systems.

With reference to FIG. 6, the computing system 600 includes one or more processing units 610, 615 and memory 620, 625. In FIG. 6, this basic configuration 630 is included within a dashed line. The processing units 610, 615 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 6 shows a central processing unit 610 as well as a graphics processing unit or co-processing unit 615. The tangible memory 620, 625 may be volatile memory (e.g., registers, cache, RAM), non-volatile memory (e.g., ROM, EEPROM, flash memory, etc.), or some combination of the two, accessible by the processing unit(s). The memory 620, 625 stores software 680 implementing one or more innovations described herein, in the form of computer-executable instructions suitable for execution by the processing unit(s). For example, memory 620 and 625 can store memory-efficient unarchiver 214 of FIG. 2.

A computing system may have additional features. For example, the computing system 600 includes storage 640, one or more input devices 650, one or more output devices 660, and one or more communication connections 670. An interconnection mechanism (not shown) such as a bus, controller, or network interconnects the components of the computing system 600. Typically, operating system software (not shown) provides an operating environment for other software executing in the computing system 600, and coordinates activities of the components of the computing system 600.

The tangible storage 640 may be removable or non-removable, and includes magnetic disks, magnetic tapes or cassettes, CD-ROMs, DVDs, or any other medium which can be used to store information and which can be accessed within the computing system 600. The storage 640 stores instructions for the software 680 implementing one or more innovations described herein. For example, storage 640 can store memory-efficient unarchiver 214 of FIG. 2.

The input device(s) 650 may be a touch input device such as a keyboard, mouse, pen, or trackball, a voice input device, a scanning device, or another device that provides input to the computing system 600. For video encoding, the input device(s) 650 may be a camera, video card, TV tuner card, or similar device that accepts video input in analog or digital form, or a CD-ROM or CD-RW that reads video samples into the computing system 600. The output device(s) 660 may be a display, printer, speaker, CD-writer, or another device that provides output from the computing system 600.

The communication connection(s) 670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer and should not be confused with acts performed by a human being. The actual computer operations corresponding to these terms vary depending on implementation.

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 6, computer-readable storage media include memory 620 and 625, and storage 640. The term computer-readable storage media does not include signals and carrier waves. In addition, the term computer-readable storage media does not include communication connections (e.g., 670).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology.

We claim:

1. A method of unarchiving data, the method comprising:
   determining that data of interest has been archived and removed from a primary data store;
   locating an archive block containing the data of interest, wherein the archive block contains the data of interest as well as additional data;
   loading the data of interest and the additional data from the archive block into a secondary data store;
   extracting the data of interest from the secondary data store;
   reloading the data of interest into the primary data store;
   storing, in an unarchived data listing, an identifier associated with the data of interest, wherein the identifier indicates that the data of interest was: loaded into the secondary data store along with the additional data from the archive block, extracted from the secondary data store, and reloaded into the primary data store; and
   based on the identifier stored in the unarchived data listing, performing operations on the data of interest without checking a data retention time period of the data of interest.

2. The method of claim 1, wherein the data of interest is reloaded into the primary data store without reloading the additional data from the archive block.

3. The method of claim 1, wherein the data of interest comprises one of a document, a file, or contents of a table.

4. The method of claim 1, wherein operations performable on the data of interest before archiving can be performed on the data of interest after reloading.

5. The method of claim 1, further comprising:
   identifying related data to the data of interest;
   locating an archive block containing the related data as well as additional unrelated data;
   loading the related data and the unrelated data into the secondary data store;
   extracting the related data from the secondary data store; and
   reloading the related data into the primary data store.

6. The method of claim 5, wherein the related data is identified based on a temporal relationship with the data of interest, a spatial relationship with the data of interest, a classification or characteristic of the data of interest, or a user identifier associated with both the related data and the data of interest.

7. The method of claim 1, wherein the data of interest was archived after the data retention time period for the data of interest was reached.

8. The method of claim 7, further comprising:
after the data of interest has been reloaded into the primary data store, maintaining the data of interest in the primary data store until a second data retention time period has elapsed; and
re-archiving the data of interest after the second data retention time period has elapsed.

9. A system, comprising:
at least one processor; and
one or more computer-readable storage media storing computer-readable instructions that, when executed by the at least one processor, perform operations comprising:
receiving a request to perform an operation on data of interest;
upon determining that the data of interest is older than a data retention time period and has been archived and removed from a primary data store, initiating memory-efficient unarchiving, the memory-efficient unarchiving comprising:
locating an archive block containing the data of interest along with other data;
loading the data of interest and the other data from the archive block into a secondary data store;
extracting the data of interest from the secondary data store; and
reloading the data of interest, but not the other data, into the primary data store, wherein the memory-efficient unarchiving is an alternative to standard unarchiving, and wherein in the standard unarchiving, both the data of interest and the additional data are reloaded into the primary data store and performing operations on data older than the data retention time period is disabled; and
performing the requested operation on the data of interest.

10. The system of claim 9, wherein the operations further comprise clearing the secondary data store after the data of interest has been reloaded into the primary data store.

11. The system of claim 9, wherein the memory-efficient data unarchiving is performed after the data of interest has been rearchived after a previous unarchiving done using the standard unarchiving.

12. The system of claim 9, wherein the operations further comprise storing, in an unarchived data listing, an identifier associated with the data of interest, wherein the unarchived data listing provides an indication of data that has been unarchived through the memory-efficient unarchiving.

13. The system of claim 12, wherein the operations further comprise prior to the memory-efficient unarchiving, checking the unarchived data listing for an identifier associated with the data of interest.

14. One or more computer-readable storage media storing computer-executable instructions for unarchiving data, the unarchiving comprising:
archiving a first data item based on a data retention time period, wherein the archiving comprises removing a group of data items, including the first data item, from primary storage and storing the group of data items together in an archive block;
after the archiving, receiving a request to access the first data item;
identifying the archive block containing the first data item;
loading the group of data items in the archive block into secondary storage separate from the primary storage;
extracting the first data item from the secondary storage;
reloading the first data item into the primary storage, wherein a group of operations performable on the first data item prior to archiving can be performed on the first data item after reloading;
storing, in an unarchived data listing, an identifier associated with the first data item, wherein the identifier indicates that the first data item was: loaded into the secondary storage along with other data items in the group of data items in the archive block, extracted from the secondary storage, and reloaded into the primary storage; and
based on the identifier stored in the unarchived data listing, performing operations on the first data item without checking a data retention time period of the first data item.

15. The computer-readable storage media of claim 14, wherein the archive block containing the first data item is identified based on an indicator in primary storage.

16. The computer-readable storage media of claim 14, wherein the unarchiving further comprises identifying data items related to the first data item, and upon determining that the related data items are archived:
locating one or more archive blocks containing the related data items;
loading contents of the one or more archive blocks into the secondary storage;
extracting the related data items from the secondary storage; and
reloading the related data items into the primary storage.

17. The computer-readable storage media of claim 16, wherein the unarchiving comprises performing one or more operations on the first data item and the related data items.

* * * * *